United States Patent [19]

Batdorf et al.

[11] Patent Number: 5,330,795
[45] Date of Patent: Jul. 19, 1994

[54] EMULSION BASED COATINGS AND A METHOD USING AN EMULSION BASED COATING TO SEAL ASBESTOS CONTAINING SOILS

[75] Inventors: Vern H. Batdorf, Minneapolis; Craig D. Cervin, Ramsey, both of Minn.

[73] Assignee: H. B. Fuller Licensing & Financing, Vadnais Heights, Minn.

[21] Appl. No.: 966,572

[22] Filed: Oct. 26, 1992

Related U.S. Application Data

[63] Continuation of Ser. No. 649,020, Feb. 1, 1991, abandoned.

[51] Int. Cl.$^5$ .............................................. B05D 3/02
[52] U.S. Cl. .................................. 427/393.6; 427/421; 427/136; 427/299
[58] Field of Search ............... 427/136, 421, 212, 221, 427/290, 299, 388.4, 393.6, 154, 271

[56] References Cited

U.S. PATENT DOCUMENTS

| | | | |
|---|---|---|---|
| 3,423,224 | 1/1969 | Schmidt et al. | 427/136 |
| 3,660,148 | 5/1972 | Heron | 117/126 AB |
| 3,723,163 | 3/1973 | Schumacher | 427/136 |
| 3,850,661 | 11/1974 | Dreher et al. | 427/136 |
| 3,939,662 | 2/1976 | Volz | 427/136 |
| 3,971,223 | 7/1976 | Barrett | 427/136 |
| 4,130,442 | 12/1978 | Petersen et al. | 427/154 |
| 4,139,676 | 2/1979 | Janssen et al. | 427/136 |
| 4,274,676 | 6/1981 | Chapel | 299/64 |
| 4,369,203 | 1/1983 | Hansen | 427/393.6 |
| 4,380,595 | 4/1983 | Arpin | 525/5 |
| 4,390,570 | 6/1983 | Rehberg | 427/393.6 |
| 4,477,490 | 10/1984 | Weisberg | 427/136 |
| 4,507,424 | 3/1985 | Webster | 427/154 |
| 4,562,109 | 12/1985 | Harvey et al. | 427/393.6 |
| 4,607,066 | 8/1986 | Barry et al. | 523/130 |
| 4,632,847 | 12/1986 | Lomasney et al. | 427/154 |
| 4,702,861 | 10/1987 | Farnum | 252/601 |
| 4,748,051 | 5/1988 | Songer et al. | 427/212 |
| 4,806,590 | 2/1989 | Padget et al. | 524/568 |
| 4,866,105 | 9/1989 | Batdorf | 134/4 |
| 5,019,291 | 5/1991 | Faulks | 427/154 |
| 5,034,247 | 7/1991 | Batdorf | 427/221 |

OTHER PUBLICATIONS

"SPEC-DATA ©" regarding SERRPIFLEX SHIELD TM Encapsulating Sealant, International Protective Coatings, Corp., May 1988.
Exhibit A–"SERPIFLEX SHIELD TM" sales brochure, International Protective Coatings Corp.
Instruction Sheet, "BWE5000 ©," The Better Working Environments, Inc., Oct. 2, 1987.

*Primary Examiner*—Shrive Beck
*Assistant Examiner*—Diana Dudash
*Attorney, Agent, or Firm*—Merchant, Gould, Smith, Edell, Welter & Schmidt

[57] ABSTRACT

The present invention is directed to a coating composition and a process for sealing an asbestos containing matrix. The coating composition may be a two-part, aqueous, emulsion based composition or a one-part, aqueous, emulsion based composition. The process comprises forming a continuous, permanent, protective coating comprising a polymer and an antimicrobial agent and leaving the coating and matrix in place to permanently seal the asbestos in the matrix.

30 Claims, No Drawings

EMULSION BASED COATINGS AND A METHOD USING AN EMULSION BASED COATING TO SEAL ASBESTOS CONTAINING SOILS

This is a continuation of application Ser. No. 07/649,020, filed Feb. 1, 1991, which was abandoned upon the filing hereof.

FIELD OF THE INVENTION

The invention is directed to emulsion based polymeric systems that can form coatings on a substrate. The invention is also directed to a method of sealing or bridging asbestos containing matrices using emulsified polymers. The invention can be used to isolate asbestos contaminated matrices from the environment.

BACKGROUND OF THE INVENTION

Emulsion coating systems generally contain emulsifiers which prevent the emulsion phase from separating out of the liquid vehicle prematurely. Practitioners have generally tried to avoid such premature phase separation as it is important for the emulsion to remain intact until after application of the system to a substrate to form acceptable coatings. Thus after the emulsion has been applied to the substrate, the liquid vehicle (water plus co-solvents) is usually volatized to leave the emulsion phase as a residual coating. Generally, this volatilization of the liquid vehicle requires lengthy drying times and/or elevated temperatures to form the film coating. Therefore, to reduce processing times when emulsion coating systems have been used, tremendous amounts of energy are required to reduce drying times. Otherwise, process times are greatly increased while the coating dries.

Emulsion coating systems are used in many industrial processes. Such processes include metal coatings, such as airplane coatings, transportation vehicle coatings, tank coatings, pipe coatings; foam coatings, asbestos abatement, and decorative panels and walls. While traditional volatilization of the liquid vehicle is satisfactory in many emulsion coating systems, the speed of useful coating formation is crucial in some coating uses. Therefore, a tough, quick-forming coating is needed which can allow the rapid reuse of a work piece or workplace after the coating is applied.

Asbestos abatement is one particular area in which the use of emulsion coating systems is growing. Asbestos has long been used for thermal insulation, particularly for high temperature surfaces or where fire proofing is required. Examples of such applications include heating plant equipment such as furnaces, boilers, steam lines, etc. Many times, this equipment is located in confined regions such as building crawl spaces, tunnels, and storage areas which have dirt floors.

With the discovery of the dangers involved in airborne, particulate asbestos, much concern has been directed to the removal and sealing of asbestos from the workplace. This is especially difficult in areas having a dirt floor as, over the years, significant amounts of particulate asbestos may have fallen to the dirt floor and become incorporated into the soil. As this soil is disturbed, the particulate asbestos can often become airborne.

Two approaches have been used to address this problem. First, the top 1-6 inches of the soil may be collected and removed. This approach requires the removal of large amounts of dirt and the handling and disposal of a hazardous substance, which is expensive.

A second approach has been to encapsulate the asbestos particles within the soil, sealing the asbestos contaminated soil from the environment. A number of formulations have been made available for this purpose. U.S. Pat. No. 4,702,861 to Farnum discloses a flame retardant formulation which may be utilized to coat or encapsulate layers of in-place asbestos. These formulations have binding and particle wetting capabilities which help it to bind and seal asbestos fibers in place. The formulation is based on an aqueous latex dispersion of polyvinylchloride-acrylic copolymer together with certain other film forming and viscosity-controlling components. This formulation appears to be intended for use in coating rigid equipment and structures. Its use in sealing deformable surfaces is not discussed, and there is no 5 indication it has the bridging strength to do so.

The "SPEC-DATA®" sheet regarding SERPAFLEX SHIELD TM Encapsulating Sealant, International Protective Coatings Corp., May 1988, discloses a water base acrylic vinyl copolymer coating used to seal sprayed asbestos insulation, fire proofing, and used as a pipe and boiler lagging.

U.S. Pat. No. 4,866,105 to Batdorf discloses an encapsulant having superior wettability and low viscosity for use in asbestos containing material removable. This encapsulant comprises a latex, a nonionic surfactant and a cationic surfactant for the improved wettability of the encapsulate, and it is intended for use on a structural unit.

U.S. Pat. No. 4,477,490 to Weisberg addresses some of these problems. This patent discloses a two-step process for encapsulating asbestos fibers in a silicate polymer and coating the encapsulated fibers with an abrasion-resistant and impact-absorbent topcoat layer of resinous copolymeric materials. This process first seals the asbestos in a hard, abrasive and brittle material which is then covered by a resinous coating to protect both the asbestos encapsulant and workers who may otherwise come into contact with the abrasive encapsulate. Unfortunately, this material may fracture when it is subjected to mechanical and thermal stresses such as foot traffic, widely fluctuating temperatures, thereby releasing asbestos particles into the atmosphere. The process also requires multiple application steps in order to provide more permanent control of asbestos particles. This is a time consuming process and often renders the workplace unusable for an extended period of time while the composition dries or cures to a sufficient degree. The topcoat does not have the capability to be used directly over soil, and it is not recommended for such a use.

Workplaces having dirt floors also provide conditions promoting the growth of microorganisms such as bacteria and fungi. These organisms can attack and seriously degrade organic compositions often used to encapsulate or bridge asbestos containing material. Some of the products of the prior art also provide only temporary encapsulation or bridging of the asbestos with the material. If the bridged dirt floor is subjected to heavy traffic, the encapsulating material may also be severely broken down through tearing stress, impact and abrasion.

Based on the current state of the art, an easily applied permanent, tough and durable coating resistant to microbial degradation is needed for bridging asbestos containing soil to prevent asbestos particles contained within from becoming airborne. A tough, quick-forming coating is also needed which can allow the rapid reuse of a workplace after the application of the coating.

SUMMARY OF THE INVENTION

The present invention is directed to a two-part composition which can quickly form a coating on a substrate. The composition comprises about 0.1 to 100 parts of a first part comprising a first polymer in a stabilized, aqueous emulsion and about 0.1 to 100 parts of a second part comprising a second polymer in a stabilized, aqueous emulsion. The emulsions for use in the invention are chosen to result in the destabilization of the emulsions upon the mixing of the two parts immediately before application. These destabilized emulsions then form a film upon application to a substrate. This film ultimately achieves a Shore A (ASTM D-2240) hardness of at least about 20, a puncture resistance of at least about 0.25 inch (0.125 inch diameter steel rod pressed into coating), and an impact resistance of at least about 10 ft/lbs (2.25 inch diameter steel ball dropped on surface) when measured on about 2 inches minimum of damp sand compacted by roller at about 50 lbs/linear ft. The film which forms the coating has a tensile strength of at least about 100 psi, and an elongation at break of at least about 50%, and does not significantly penetrate the matrix.

The present invention is also directed to a process for sealing an asbestos containing matrix. The process comprises forming a continuous, permanent, protective coating comprising polymers, flame retardants, flow control additives, and an antimicrobial agent, and leaving the coating and matrix in place to permanently seal the asbestos in the matrix. The permanent coating has a tensile strength of at least about 100 psi and an elongation at break of at least about 50%. The permanent coating has a Shore A hardness of at least about 20, a puncture resistance of at least about 0.25 inch, and an impact resistance of at least about 10 ft/lbs when measured on about 2 inches minimum of damp sand compacted by roller at about 50 lbs/linear ft.

As used in the specification and in the claims, the term "matrix" means any porous or nonporous structure or conglomeration of particulate material having an average particle size of less than about 0.5 inches diameter, into which a particulate asbestos material may migrate. Examples of such matrices include concrete, mortar, earth, aggregate, sand, gravel, dirt, clay, etc.

The phrase "antimicrobial agent" means any material, compound, or composition which inhibits degradation of an organic substance caused by microbes including bacteria, and fungi.

DETAILED DISCUSSION OF THE INVENTION

The compositions of the invention generally comprise at least one film forming polymer dispersed in an aqueous emulsion which can form a tough, durable, elastic film on a matrix substrate. The emulsions used in the present invention are preferably polymers which are capable of forming a tough, continuous, permanent protective coating. In one preferred embodiment this coating can be used to seal asbestos in a matrix from the environment. Representative, non-limiting examples of such polymers include polychloroprene, butyl latex, styrene-butadiene copolymer, polyacrylic polymers, vinyl-acrylic or styrene-acrylic copolymers, vinyl acetate/ethylene copolymers, vinylidene chloride/polyvinyl chloride polymers, vinylidene chloride/butadiene copolymers, vinylidene chloride/polyvinyl chloride/acrylic terpolymers, vinylidene chloride/butadiene/acrylic terpolymers, polyurethanes, etc. These emulsions may be further stabilized by incorporating compounds which are capable of increasing the stability of the discrete portions of the polymer in water. Such stabilizers may be anionic, cationic or nonionic surfactants or mixtures thereof, depending upon the characteristics desired for the emulsion and the emulsion type. A top portion of the matrix can be removed prior to applying the emulsion to the matrix. Alternatively, the matrix can be compacted or a reinforcing layer can be layed on the matrix prior to forming the protective coating on the matrix. The matrix can also be on a building site.

The compounded coating composition of the present invention generally comprises about 30 to 75 wt-% solids, more preferably 50 to 70 wt-% solids. Most preferably, the coating composition of the present invention comprises about 55 to 65 wt-% solids. In other words, the coating compositions of the present invention generally comprise about 70 to 25 wt-% water more preferably about 50 to 30 wt-% water, and most preferably about 45 to 35 wt-% water. Such compositions generally result in a coating composition having a viscosity of about 2,000 to 40,000 cP, more preferably about 5,000 to 30,000 cP, and most preferably about 10,000 to 20,000 cP. The amount of stabilizers present in the emulsion may vary depending on the particular emulsion system chosen. Preferably, the stabilizers are present at up to about 5 wt-% of the coating composition, more preferably about 0.2 to 3.0 wt-%, and most preferably about 0.5 to 2.0 wt-% of the coating composition.

The polymer chosen for the present invention is selected to result in the formation of film of sufficiently high quality to resist damage from foot traffic, impact, and other heavy wear and tear. The film formed preferably has a tensile strength of at least about 100 psi, more preferably from about 200 to 3000 psi and most preferably from about 300 to 1000 psi. Additionally, the film has a maximum elongation break of preferably at least about 50%, more preferably at least about 200% and most preferably from about 500 to 2000%. Other helpful qualities of the product film, measured on about 2 inches of damp sand compacted with a roller at about 50 lbs/linear ft, include a Shore A hardness of about 20 to 100, preferably from about 40 to 80, a puncture resistance of about 0.25 to 1.5 inches, preferably from about 0.5 to 1.0 inches and an impact resistance of at least about 10 ft/lbs, more preferably from about 10 to 100 ft/lbs. Upon application, the coating composition is preferably of sufficient viscosity and thixotropy to prevent significant penetration of a porous matrix substrate prior to the formation of the film.

Another preferred component in the film forming composition of the present invention is an antimicrobial agent. This is especially valuable when the film is to be formed on moist soil or to be used in other humid environments having favorable conditions for microbial growth. The antimicrobial agent or agents are especially important if the film is to be applied in areas subject to attack by fungi, bacteria and other microorganisms which could otherwise destroy the desired properties of the film. Indeed, it is often helpful to use combinations of various antimicrobial agents, e.g., a bactericide and a fungicide to protect against any variety of microbial attack. Representative, non-limiting examples of antifungal and antibacterial compositions include inorganic compounds such as barium metaborate and zinc oxide, 3-iodo-2-propynylbutyl carbamate, diiodomethyl p-tolylsulfone, or organic compounds such as Kathon LX 1.5% (Rohm & Haas Co.), Busan 40 (Buckman Labs), Amerstat 251 (Drew Chemical Corp.), and Polyphase and Troysan 192 (Troy Chemical Company), preferably, the fungicide is present at about 0.5 to 15 parts per 100 parts by weight of the polymer.

One preferred embodiment, for use as a bridging composition to seal asbestos in a matrix such as soil, comprises an aqueous emulsion of a film forming polymer and an antimicrobial agent. The polymer within the emulsion preferably comprises polychloroprene, butyl latex, styrene-butadiene copolymer, a polyacrylic polymer, a vinyl-acrylic or styrene-acrylic copolymer, vinyl acetate/ethylene copolymer, vinylidene chloride/polyvinyl chloride copolymer, vinylidene chloride/butadiene copolymer, vinylidene chloride/polyvinyl chloride/acrylic terpolymer, vinylidene chloride/butadiene/acrylic terpolymer, polyurethane or mixtures thereof. More preferably, the polymer comprises polychloroprene, butyl latex, styrene-butadiene copolymer, polyurethane or mixtures thereof. Most preferably, the polymer comprises polychloroprene. The compounded coating composition is preferably stabilized with about 0.2 to 1.5 wt-% nonionic surfactant. In this preferred embodiment, an antimicrobial agent is included in the composition to combat attack on the coating by bacteria and fungi. The antimicrobial agent may be a single compound or may be a mixture of compounds to obtain an optimal efficacy against potential attack. This composition preferably has a viscosity of about 10,000 to 20,000 cP and about 55 to 65 wt-% solids.

The viscosity, thixotropy and solids content of the liquid composition prevent it from penetrating too deeply into a porous matrix. Indeed, the liquid composition preferably will not penetrate deeper than about 6 cm into a matrix comprising densely packed sand. More preferably, penetration into densely packed sand will not exceed about 3 cm, and most preferably, about 1 cm. This lack of penetration allows the formation of a relatively uniform film on top of a porous matrix substrate. Of course, the liquid composition ill not penetrate a non-porous substrate and will instead firmly adhere to the surface of such a substrate.

The composition of the present invention may be applied by any method currently used in the art. Such methods include spraying, pouring, brushing, roll coating, extruding and troweling. These methods result in a dry coating of about 5 to 80 mils. Preferably, the initial deposition of the film forming composition is done by spraying. More preferably, the spraying is carried out using an airless sprayer. In order to achieve a permanent protective coating, the composition is preferably applied at a rate of about 10 to 100 sq. ft. of matrix surface/gal of liquid using a composition having about 55 to 65 wt.% solids. This can typically result in a dried coating of about 30 to 50 mils. Once the composition has been applied, it is dried to form a permanent, protective coating. This coating has a tensile strength of at least about 100 psi, and elongation at break of at least about 50%, a Shore A hardness of at least about 20, (ASTM D-2240) a puncture resistance of at least about 0.25 inches and an impact resistance of at least about 10 ft/lbs.

Puncture resistance is tested by pressing a 0.125 inch diameter steel rod straight down into the coating applied over a minimum 2 inch thickness of soil, and measuring the depth of penetration before tearing the film.

Impact resistance is measured by dropping a 2.25 inch diameter steel ball onto the coating applied over a minimum of 2.0 inch thickness of soil, and measuring the maximum height it can be dropped without tearing the film.

When used as a soil bridging composition incorporating an antimicrobial agent, the resulting film exhibits excellent antifungal and antibacterial characteristics. Other possible uses include, but are not limited to, exterior foundation coating where back filled with soil, moisture barrier membrane under floor toppings, insulation protective coating for tanks and pipes, antiabrasion coating in storage containers, undercoating for cars and trucks, and protective coating for metal parts and equipment.

In a second preferred embodiment the liquid coating composition comprises two separate parts, part A and part B, which are mixed prior to application. Both part A and part B each individually comprise a stabilized emulsion comprising a polymer and a stabilizer. The polymer within the emulsion preferably independently comprises polychloroprene, butyl latex, styrene-butadiene copolymer, a polyacrylic polymer, a vinyl-acrylic or styrene-acrylic copolymer, vinyl acetate/ethylene copolymer, vinylidene chloride/polyvinyl chloride copolymer, vinylidene chloride/butadiene copolymer, vinylidene chloride/polyvinyl chloride/acrylic terpolymer, vinylidene chloride/butadiene/acrylic terpolymer, polyurethane or mixtures thereof. More preferably, the polymer comprises polychloroprene, butyl latex, styrene-butadiene copolymer, polyurethane or mixtures thereof. Most preferably, the polymer comprises polychloroprene. The compounded coating composition is preferably stabilized with about 0.2 to 1.5 wt-% nonionic surfactant for Part A and about 0.2 to 1.5 wt-% anionic surfactant for Part B. The stabilizers selected for Parts A and B are chosen such that upon combining the two Parts A and B, both polymer emulsions are unstabilized and begin to form a film. This may be accomplished by incorporating a nonionic surfactant stabilized latex in one part and an ionic surfactant stabilized latex in the other part of the composition. It may also result from incorporating incompatible ionic surfactant stabilizers, one in Part A and the other in Part B. Preferably, a nonionic surfactant stabilized latex is used in one part and an anionic surfactant stabilized latex is used in the other part. Also, a separate destabilizer can be added as the Part B.

The selection of polymer in the emulsion of Parts A and B is controlled in some degree by the properties desired in the resulting film and by the ability of the polymers to interact to form a film. This may be achieved by selecting the same or substantially similar polymers for use in each Part A and Part B of the composition. However, it may be possible to select different compatible polymers for Part A and Part B, such as chloroprene with butyl latex, or ethylene vinyl acetate, or styrene butadiene polymers.

Preferably, Part A is a nonionic surfactant stabilized polychloroprene emulsion and Part B is an anionic surfactant stabilized polychloroprene emulsion.

Additionally, at least one of the Parts A and B of the composition may comprise an antimicrobial agent or other optional compounds described above. For use as a soil bridging composition, it is preferred that at least one of Parts A and B additionally comprises an antimicrobial agent described above.

Additional compositions which may be incorporated into either or both parts of the liquid film forming composition include pigments such as titanium dioxide; fillers such as calcium carbonate, talc, clay, wollastonite and hydrated alumina; surfactants and defoamers such as alkyarylpolyether alcohol, sodium salt of carboxylated polyelectrolyte, and silicones; freezing point depressants such as ethylene glycol, alcohols and water soluble polymers; thixotropes such as cellulosic polymers and associated thickeners; crosslinking agents such as zinc oxide, magnesium oxide, amines, titanares; reinforcement fibers; antioxidants; and other compositions which may add desired properties to the composition and which do not detract from its film forming properties.

Preferably, Parts A and B individually have a viscosity of about 10 to 20,000 cP and about 45 to 65 wt-% solids. When these parts are combined the mixture preferably has a viscosity of about 1,000 to 15,000 cP and about 50 to 60 wt-% solids prior to application.

The viscosity, solids content and rapid film formation of the two-part system prevent it from penetrating too deeply into a porous matrix. Indeed the two-part system will not penetrate deeper than about 6 cm into a matrix comprising densely packed sand. More preferably, penetration into densely packed sand will not exceed about 3 cm, and most preferably, about 1 cm. This lack of penetration allows the formation of a relatively uniform film on top of a porous matrix substrate. Of course, the two-part system will not penetrate a non-porous substrate and will instead firmly adhere to the surface of such a substrate.

The application of the two-part coating composition proceeds in a slightly different manner than that of a one-part composition. Prior to application, Part A and Part B are mixed, and the mixture may be applied by spraying, pouring, brushing, roll coating, troweling, extruding and by squeegee. Again, the preferred method of application is by spraying using an airless sprayer. Depending on the particular emulsions and stabilizers used, the composition may form a film within seconds, minutes or hours, which film is durable enough to be walked upon. The coating may be applied at a rate of about 4 to 6 gal/ft$^2$ to form a coating having a thickness of about 30 to 50 mils. The resulting film may have a Shore A hardness of about 40 to 80, a puncture resistance of about 30 to 80 ft/lbs, an impact resistance of about 0.5 to 1.0 inch, a tensile strength of about 100 to 1000 psi, and an elongation at break of at least about 50%.

The two component system, which sets much faster than the one component coating, can be walked on after 24 hours of dry time versus 72 hours for the one component coating.

The two-component system may also be used as a soil bridging composition comprising an antimicrobial agent as well as exterior foundation coating where back filled with soil, moisture barrier membrane under floor toppings, insulation protective coating for tanks and pipes, antiabrasion coating in storage containers, undercoating for cars and trucks, and protective coating for metal parts and equipment.

The present invention may be further understood by reference to the following specific examples which are illustrative of various aspects of the invention and contain a best mode.

EXAMPLE 1

About 50 parts of polychloroprene latex (at 47% solids content) were added to a mixer, along with about ½ part of oil-based defoamer, and one part of an isobutyrate cosolvent. After about one minute of mixing, a small amount (less than ¼ part) of a nonionic surfactant was added. After about one additional minute of mixing, about ½ part of an amino-type cosolvent was added. After about one additional minute of mixing, ½ part of a glycol, about 4-½ parts of zinc oxide, about 6 parts titanium dioxide, and about 2 parts of hydrated alumina were added. After about 2 additional hours of mixing, approximately one part of a hindered phenol-type antioxidant, less than ¼ part of an amino-ethanol biocide, and about ½ part of a carbamate-type mildewcide were added. After about 10 additional minutes of mixing, about 1-½ parts of water and about 2 parts of sodium silicate were added. After about 30 additional minutes of mixing, about ¾ part of a premix composed of equal parts of an associative thickener and a glycol were added. After about 30 additional minutes of mixing, about 6-½ parts of water and about one part of oil-based defoamer were added, and the resultant batch was mixed until smooth and uniform. (All parts are by weight).

EXAMPLES 2-6

In a similar fashion as in Example 1, the following examples were prepared.

TABLE 2

| Component | Compositions | | | | |
|---|---|---|---|---|---|
| | Ex 2 | Ex 3 | Ex 4 | Ex 5 | Ex 6 |
| Carboxylated 65% Styrene SBR latex (50% solids) | 37.0 | | | | |
| Butyl latex (62%) | | | | | 37.0 |
| Vinyl acetate-ethylene, copolymer latex (56 solids) | | | 50.0 | | |
| Vinylchloride Acrylic Copolymer (49% solids) | | 45.0 | | | 16.0 |
| Acrylic latex (Tg = −45° C.) (63% solids) | | | | 28.0 | |
| Acrylic latex (−Tg = +5° C.) (46.5% solids) | | | | 13.0 | |
| Nonionic Surfactant | | .4 | .8 | .5 | .5 |
| Dispersant | .3 | .9 | .7 | .5 | .5 |
| TiO$_2$ pigment | 5.0 | 5.5 | 3.5 | 5.0 | 6.0 |
| Defoamer | .5 | .5 | .3 | 1.0 | .5 |
| Hydrated Alumina | 26.5 | 16.0 | 21.0 | 20.0 | 24.0 |
| Fungicide (Polyphase) | .2 | | | | 1.0 |
| Fibers (Wollastonite) | 10.0 | | 6.0 | | |

TABLE 2 -continued

| Component | Compositions | | | | |
|---|---|---|---|---|---|
| | Ex 2 | Ex 3 | Ex 4 | Ex 5 | Ex 6 |
| Antioxidant | .2 | | | | 1.0 |
| Coalescent solvent | .7 | .4 | .5 | .7 | 1.0 |
| Thickener (such as Hydroxpropyl methyl cellulose | .3 | .4 | .4 | .25 | .3 |
| Plasticizer (Liquid chlorinated Paraffin) | 6.0 | 9.0 | | | |
| Water | 13.3 | 13.4 | 4.5 | 14.05 | 9.9 |
| Calcium Sulfate, hydrated | | 8.5 | | | |
| Ethylene Glycol | | | | .8 | .8 |
| Calcium Carbonate | | | 11.5 | 8.5 | |
| Zinc Oxide | | | | 8.5 | 1.5 |
| Total | 100.0 | 100.0 | 100.0 | 100.0 | 100.0 |

TABLE 3

Property Inspection of Compositions of Table 2

| | Ex 1 | Ex 2 | Ex 3 | Ex 4 | Ex 5 | Ex 6 |
|---|---|---|---|---|---|---|
| % Volume Solids | 45 | 57 | 49 | 63 | 53 | 58 |
| Viscosity, cP | 15,000 | 70,000 | 23,000 | 140,000 | 16,000 | 15,000 |
| Tensile Strength, psi | 400 | 450 | 230 | 350 | 200 | |
| % Elongation at break | 1000 | 130 | 500 | 400 | 300 | | resultant batch was mixed until smooth and uniform. (All parts are by weight).

EXAMPLE 9

The emulsions of Examples 1, 7 and 8 and a polychloroprene resin having 37.5% chlorine, 50 % solids, anionic surfactant, and a viscosity of about 15 cP (available as Neoprene 571 from E. I. DuPont) were added in varying ratios as described below in Table 4. Additional components were added in a few samples.

TABLE 4

| Part A | Part B | Mix Ratio (A:B) | Additive | Approximate Gel Time |
|---|---|---|---|---|
| Ex. 7 | Neoprene 571 | 2:1 | — | 15-30 sec. |
| Ex. 7 | Neoprene 571 | 1.7:1.3 | — | 30-60 sec. |
| Ex. 7 | Neoprene 571 | 1:1 | — | 1-3 hr. |
| Ex. 7 | Neoprene 571 | 1:2 | — | over 3 hr. |
| Ex. 1 | Ex. 8 | 2:1 | — | 120-180 sec. |
| Ex. 1 | Ex. 8 | 2:1 | 1% QAS[1] | 90-150 sec. |
| Ex. 1 | Ex. 8 | 2:1 | 2% QAS[1] | 15-30 sec. |
| Ex. 1 | Ex. 8 | 2:1 | 5% Sodium Silicate | 10-20 sec. |

[1]Quaternary Ammonium Salt

From the above data, it can be seen that the two-part film forming composition can result in a film over a wide range of time depending on the relative amounts and emulsions used. It can also be seen that the incorporation of sodium and quaternary ammonium salts can greatly decrease the gel time upon mixing of the two component parts.

EXAMPLE 10

A series of experiments were run using the emulsion of Examples 1 and 7 as well as the polychloroprene emulsion having 37.5% chlorine, 50 % solids, anionic surfactant, and a viscosity of about 15 cP (Neoprene 571 available from E. I. DuPont) to determine film properties upon aging. The results are shown below in Table 5.

TABLE 5

| Part A | Part B | Mix Ratio (A:B) | Film Aging | Tensile (PSI) | Elongation % |
|---|---|---|---|---|---|
| Ex. 1 | Neoprene 571 | 1.7:1.3 | 1 hr @ 77° F. | 30 | 1,800 |
| Ex. 1 | Neoprene 571 | 1.7:1.3 | 24 hr @ 77° F. | 150 | 2,000 |
| Ex. 1 | Neoprene 571 | 1.7:1.3 | 7 days @ 77° F. | 300 | 2,000 |
| Ex. 1 | Neoprene 571 | 1.7:1.3 | 7 days @ 140° F. | 1,300 | 1,500 |
| Ex. 7 | Neoprene 571 | 1:1 | 30 days @ 77° F. | 500 | 1,700 |

From the above data it can readily be seen that films of the present invention can have excellent toughness and would perform well in high traffic areas.

The above descriptions and examples are provided to aid in a complete, nonlimiting understanding of the invention. Since many variations of the invention can be made without departing from the spirit and scope of the invention, the breadth of the invention resides in the claims hereinafter appended.

We claim:

1. A process for sealing an asbestos containing particulate matrix with at least one coating from subsequent asbestos release, which process comprises applying a film forming aqueous emulsion to form a continuous, permanent, protective coating directly on the asbestos containing matrix, said aqueous emulsion comprising about 25 to 70 wt-% water, a polymer, and about 30 to 75 wt-% solids based on the emulsion as a whole, said emulsion further comprising from about 0.5 to 2.0 wt-% surfactant stabilizer based on the emulsion as a whole.

2. The process of claim 1 wherein the dry coating has a thickness of about 5 to 80 mils.

3. The process of claim 1 wherein the matrix is sealed with a single coating.

4. The process of claim 1 wherein the coating is applied to the asbestos containing matrix as a liquid having a viscosity of about 2,000 to 40,000 cp.

5. The process of claim 4 comprising spraying the emulsion having about 30 to 75 wt-% solids onto the matrix.

6. The process of claim 4 further comprising applying the emulsion to the surface of the matrix at a rate of about 10 to 100 sq. ft. of matrix surface/gal of emulsion.

7. The process of claim 1 wherein the polymer is polychloroprene, butyl latex, styrene-butadiene copolymer, a polyacrylic polymer, a vinyl-acrylic or styrene-acrylic copolymer, vinyl acetate/ethylene copolymer, vinylidene chloride/polyvinyl chloride copolymer, vinylidene chloride/butadiene copolymer, vinylidene chloride/polyvinyl chloride/acrylic terpolymer, vinylidene chloride/butadiene/acrylic terpolymer, polyurethane or mixtures thereof.

8. The process of claim 1 wherein said surfactant stabilizer comprises an anionic surfactant or a nonionic surfactant.

9. The process of claim 1 wherein the antimicrobial agent comprises a fungicide.

10. The process of claim 9 wherein the fungicide is present at about 0.5 to 15 parts per 100 parts by weight of the polymer.

11. The process of claim 9 wherein the fungicide comprises zinc oxide, 3-iodo-2-propynylbutyl carbamate, barium metaborate, diiodomethyl p-tolylsulfone, or mixtures thereof.

12. The process of claim 1 further comprising removing a portion of an outer surface of the matrix prior to applying the emulsion to the matrix.

13. The process of claim 1 further comprising compacting the matrix prior to applying the aqueous emulsion to the matrix.

14. The process of claim 1 wherein the matrix further comprises concrete, mortar, earth, aggregate, clay, or mixtures thereof.

15. The process of claim 1 further comprising laying a reinforcing layer on the matrix prior to forming the protective coating on the matrix.

16. A process for sealing an asbestos containing particulate matrix, from subsequent asbestos release, with at least one coating, which process comprises:
   (a) combining a first aqueous emulsion with a second aqueous emulsion to provide a film forming aqueous emulsion, said first aqueous emulsion comprising a first polymer and a first stabilizing surfactant, said second aqueous emulsion comprising a second polymer and a second surfactant stabilizer; and
   (b) applying said film forming aqueous emulsion having a viscosity of about 2,000 to 40,000 cP directly to a surface of the asbestos containing matrix to form a continuous, permanent, protective film, wherein, once combined, said film forming aqueous emulsion comprises:
      i. a polymer in an aqueous emulsion having about 30–75 wt-% solids and about 25 wt-% to 70 wt-% water; and
      ii. an effective microbe inhibiting amount of an antimicrobial agent to form the continuous, permanent, tough, protective film to permanently seal the asbestos in the matrix;
   wherein, upon drying, the film has a Shore A hardness of about 40 to 80, a puncture resistance of about 0.5 to 1.0 inches, an impact resistance of about 30 to 80 ft-lbs, a tensile strength of about 200 to 1000 psi and an elongation at break of at least about 50%.

17. The process of claim 16 wherein the film has a dry thickness of about 5 to 80 mils.

18. The process of claim 16 wherein the matrix is sealed with a single coating.

19. The process of claim 16 further comprising spraying the liquid coating onto the matrix.

20. The process of claim 16 further comprising applying the liquid at a rate of about 10 to 100 sq. ft. of matrix surface/gallon of liquid.

21. The process of claim 16 wherein the polymer is polychloroprene, butyl latex, styrene-butadiene copolymer, a polyacrylic polymer, a vinyl-acrylic or styrene-acrylic copolymer, vinyl acetate/ethylene copolymer, vinylidene chloride/polyvinyl chloride copolymer, vinylidene chloride/butadiene copolymer, vinylidene chloride/polyvinyl chloride/acrylic terpolymer, vinylidene chloride/butadiene/acrylic terpolymer, polyurethane or mixtures thereof.

22. The process of claim 16 wherein said first surfactant and said second surfactant are selected from the group consisting of an anionic surfactant, a nonionic surfactant, and mixtures thereof.

23. The process of claim 16 wherein the liquid coating further comprises about 1 to 10 parts of a cross-linking agent per 100 parts by weight of the polymer.

24. The process of claim 16 wherein the antimicrobial agent comprises a fungicide.

25. The process of claim 24 wherein the fungicide is present at about 0.1 to 25 pars per 100 parts by weight of the polymer.

26. The process of claim 24 wherein the fungicide is oxide, diiodomethyl p-tolylsulfone, 3-iodo-2-propynylbutyl carbamate, barium metaborate, or mixtures thereof or others.

27. The process of claim 16 further comprising compacting the matrix prior to applying the liquid coating to the matrix.

28. The process of claim 16 wherein the matrix further comprises concrete, mortar, earth, aggregate, clay, or mixtures thereof.

29. The process of claim 16 wherein the matrix is located on a building site.

30. The process of claim 16 further comprising laying a reinforcing layer on the matrix prior to applying the liquid to the matrix.

* * * * *

UNITED STATES PATENT AND TRADEMARK OFFICE
CERTIFICATE OF CORRECTION

PATENT NO. : 5,330,795

DATED : July 19, 1994

INVENTOR(S) : Batdorf et al.

It is certified that error appears in the above-identified patent and that said Letters Patent is hereby corrected as shown below:

On column 1, line 27, please delete "volatized" and substitute therefore --volatilized--

On column 2, line 23, please delete "base" and substitute therefore --based--

On column 2, line 24, please insert --and-- after the word "insulation"

On column 2, line 25, please insert --adhesive-- after the word "lagging"

On column 2, line 45, please insert --and-- after the word "traffic"

On column 5, line 8, please delete "," and substitute therefore --.--

On column 5, line 9, please delete "preferably" and substitute therefore --Preferably--

On column 8, table 2, please delete "-" before the second instance of "Tg"

On column 12, line 36 (claim 25), please delete "pars" and substitute therefore --parts--

UNITED STATES PATENT AND TRADEMARK OFFICE
CERTIFICATE OF CORRECTION

PATENT NO. : 5,330,795

DATED : July 19, 1994

INVENTOR(S) : Batdorf et al.

It is certified that error appears in the above-indentified patent and that said Letters Patent is hereby corrected as shown below:

On column 2, line 18, please delete "5" after the word "no"

On column 2, line 28, please delete "removable" and substitute therefore --being removed--

On column 5, line 46, please delete "ill" and substitute therefore --will--

On column 7, line 14, please delete "titanares" and substitute therefore --titanates--

On column 7, line 48, please delete "30to" and substitute therefore --30 to--

On column 9, line 25, "at break" should be on line 36

On column 9, line 25, please delete "at break" and insert --at break-- after the word "elongation"

On column 10, line 61, please delete "cp" and substitute therefore --cP--

UNITED STATES PATENT AND TRADEMARK OFFICE
CERTIFICATE OF CORRECTION

PATENT NO. : 5,330,795
DATED : July 19, 1994
INVENTOR(S) : Batdorf et al.

It is certified that error appears in the above-indentified patent and that said Letters Patent is hereby corrected as shown below:

On column 11, line 20, please delete "p-tolysulfone" and substitute therefore --p-tolylsulfone--

Signed and Sealed this

Seventeenth Day of January, 1995

Attest:

BRUCE LEHMAN

Attesting Officer     Commissioner of Patents and Trademarks